US008108649B2

(12) United States Patent
Inoue et al.

(10) Patent No.: US 8,108,649 B2
(45) Date of Patent: Jan. 31, 2012

(54) METHOD OF MEMORY MANAGEMENT FOR SERVER-SIDE SCRIPTING LANGUAGE RUNTIME SYSTEM

(75) Inventors: Hiroshi Inoue, Yokohama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 12/138,998

(22) Filed: Jun. 13, 2008

(65) Prior Publication Data
US 2009/0313451 A1 Dec. 17, 2009

(51) Int. Cl.
G06F 13/00 (2006.01)
G06F 13/28 (2006.01)
(52) U.S. Cl. .............. 711/171; 711/6; 711/E12.006
(58) Field of Classification Search .......... 711/6, 171, 711/E12.006
See application file for complete search history.

(56) References Cited

U.S. PATENT DOCUMENTS

| | | | | |
|---|---|---|---|---|
| 5,784,699 | A * | 7/1998 | McMahon et al. | 711/171 |
| 5,978,893 | A * | 11/1999 | Bakshi et al. | 711/171 |
| 6,131,150 | A * | 10/2000 | DeTreville | 711/173 |
| 6,175,900 | B1 * | 1/2001 | Forin et al. | 711/156 |
| 6,363,468 | B1 * | 3/2002 | Allison | 711/173 |
| 6,442,661 | B1 * | 8/2002 | Dreszer | 711/170 |
| 6,594,749 | B1 * | 7/2003 | Czajkowski | 711/170 |
| 7,035,989 | B1 * | 4/2006 | Hinker et al. | 711/171 |
| 2002/0099921 | A1 * | 7/2002 | Bonola | 711/170 |
| 2003/0120887 | A1 * | 6/2003 | Kim et al. | 711/173 |
| 2004/0039884 | A1 * | 2/2004 | Li | 711/156 |
| 2005/0005083 | A1 * | 1/2005 | Ozdemir et al. | 711/170 |
| 2005/0055526 | A1 * | 3/2005 | Challenger et al. | 711/170 |
| 2005/0188164 | A1 * | 8/2005 | Ballantyne et al. | 711/159 |
| 2006/0069898 | A1 * | 3/2006 | Patel et al. | 711/171 |

OTHER PUBLICATIONS

FreeSd, [online], [retrieved on Jun. 13, 2008]; retrieved from the Internet http://docs.freebsd.org/44doc/papers/kernmalloc.html M. McKusick et al. "Design of a General Purpose Memory Allocator for the 4.3BSD UNIX** Kernel," Reprinted from Proceedings of the San Francisco USENIX Conference, Jun. 1988, pp. 295-303.
Oswego University, [online], [retrieved on Jun. 13, 2008]; retrieved from the Internet http://g.oswego.edu/dl/html/malloc.html D. Lea, "A Memory Allocator", Dec. 1996.

(Continued)

*Primary Examiner* — Edward Dudek, Jr.
(74) *Attorney, Agent, or Firm* — Cantor Colburn LLP; Vazken Alexanian (57) ABSTRACT

A method of operating a memory system includes allocating a portion of a memory unit in a computing system as a memory heap. The heap includes a metadata section and a plurality of segments, each segment having a segment size. The method also includes creating a free list array and class-size array in the metadata section, the class-size array being created such that each element of the size-class array is related a particular one of the plurality of segments and the free list array being created such that each element of the free list array is related to a particular size class, receiving a first memory allocation request for a first object, determining that the first object is a small object, assigning a class to the first object, identifying a first segment to place the first object in by examining the size-class array, subdividing the first segment into multiple portions, determining a first head portion of the first segment, the first head portion representing the first open portion of the segment and being determined by examining the free list array, allocating the first head portion for the first object, receiving a command indicating that a transaction is complete, and clearing the free list array and the size-class array upon receipt of the command.

18 Claims, 7 Drawing Sheets

OTHER PUBLICATIONS

S. Schneider et al., "Scalable Locality-Conscious Multithreaded Memory Allocation," ISMM'06, Jun. 10-11, 2006, pp. 84-94, Ottawa, Ontario, Canada.

Goog-Perftools, [online], [retrieved on Jun. 13, 2008]; retrieved from the Internet S. Ghemawat et al., "TCMalloc: Thread-Caching Malloc".

* cited by examiner

Processing System – 500

METHOD OF MEMORY MANAGEMENT FOR SERVER-SIDE SCRIPTING LANGUAGE RUNTIME SYSTEM

BACKGROUND OF THE INVENTION

The present disclosure relates generally to memory management, and, in particular, to memory management server-side scripting language runtime system.

Runtime systems for the scripting of programming languages often consume considerable amounts of central processing unit (CPU) time for dynamic memory management. Programming and scripting languages typically include specific function to allocate and free memory. For example, the functions "malloc" and "free" are typically utilized, respectively, for allocating and freeing memory.

The "malloc" function is the basic function used to allocate memory on the heap (dynamic memory) in the C and C++ programming langauges. Its function prototype is void *malloc(size_t size), which allocates "size" bytes of memory. If the allocation succeeds, malloc returns a void pointer (void *), which indicates that it is a pointer to a region of unknown data type. Memory allocated via malloc is persistent: it will continue to exist until the program terminates or the memory is explicitly unallocated by the programmer (that is, the block is said to be "freed").

Freeing blocks is achieved by use of the "free" function. Its prototype is void free(void *pointer), which releases the block of memory pointed to by "pointer." Pointer must have been previously returned by malloc or calloc (cache allocation) or a function which uses one of these functions (e.g., strdup), and must only be passed to the function free once.

To keep the entire heap in a healthy state, general purpose memory allocators utilizing malloc and free have to perform many activities in addition to allocation and freeing activities. Such activities shall be referred to herein as "bookkeeping activities." A general-purpose memory allocator often consumes a large fraction of the CPU's time in malloc and free for the bookkeeping activities. The actual implementation of the bookkeeping activities depends on the implementation of the allocator and is a major area of innovation. One example of bookkeeping used in a well known a memory allocator sorts all of the objects in the free lists in order of their size, coalesces multiple small objects into large objects, and splits large objects into small objects in response to requests. Other bookkeeping activities may include de-fragmenting the unallocated memory chunks. In short, memory allocators often spent a larger amount of CPU time for bookkeeping activities than for the allocations themselves. These bookkeeping activities are, however, necessary for general-purpose allocators to avoid gradual performance degradations of the applications, both in execution time and memory consumption.

Scripting languages, are becoming increasingly popular for developing Web applications even for large commercial websites. An example of such a scripting language includes hypertext preprocessor (PHP). PHP was originally designed for producing dynamic web pages and is used for server-side scripting. PHP may also be used from a command line interface or in standalone graphical applications. Another example of such a scripting language is Ruby.

One important characteristic of Web applications written in such scripting languages is that most server-side memory objects allocated during a transaction are transaction scoped. That is, the memory objects only exist during that transaction and these objects can be destroyed after the transaction ends. The current PHP server-side runtime initializes a heap (a portion of dynamic memory) for transaction-scoped objects so that it can reliably reclaim all of the memory allocated to them at the end of each transaction by discarding the entire heap.

Region-based memory management is a well-known technique to reduce the overhead of memory management for applications that destroy many objects together and reclaim their memory. For example, scripting languages may utilize region-based memory management.

The region-based allocators obtain a large chunk of memory from an underlying allocator and the allocation may be accomplished by merely incrementing a pointer. The region-based allocator reclaims all of the memory allocated within a region when the region is destroyed by calling the "freeAll" function which decrements the pointer. Thus, the overhead of both allocation and deallocation is fairly small. Some real-world applications use this technique. For example the Apache HTTP server has a region-based custom memory allocator that frees and reclaims all of the objects allocated to serving an HTTP connection when that connection terminates. Extensive analyses for many workloads using custom memory allocators has been conducted and reported that region-based custom allocators often improved the performance of applications, though other kinds of custom allocators did not improve the performance compared to a state-of-the-art general-purpose memory allocator. Further, region-based memory management may suffer from two particular problems: excessive memory consumption and performance degradation of applications due to increased bus transactions. In addition, region-based memory management does not allow for pre-object free commands.

What is needed, therefore, is a memory management approach that efficiently allocates and frees memory without degrading system performance.

BRIEF SUMMARY OF THE INVENTION

Embodiments of the invention include a method of operating a memory system. The method of this embodiment includes allocating a portion of a memory unit in a computing system as a memory heap, the heap including a metadata section and a plurality of segments, each segment having a segment size. The method of this embodiment also includes creating a free list array and class-size array in the metadata section, the class-size array being created such that each element of the size-class array is related a particular one of the plurality of segments and the free list array being created such that each element of the free list array is related to a particular size class, receiving a first memory allocation request for a first object, determining that the first object is a small object, assigning a class to the first object and identifying a first segment to place the first object in by examining the size-class array. The method of this embodiment also includes subdividing the first segment into multiple portions, determining a first head portion of the first segment, the first head portion representing the first open portion of the segment and being determined by examining the free list array, allocating the first head portion for the first object. The method of this embodiment also includes receiving a command indicating that a transaction is complete and clearing the free list array and the size-class array upon receipt of the command.

Another embodiment of the present invention is directed to a system including a central processing unit (CPU), a memory coupled to the CPU, and a memory manager coupled the CPU and the memory. The memory manager of this embodiment is configured to allocate portions of the memory for objects based on commands received from a scripting program. The memory manager of this embodiment is is further configured to: allocate a portion of the memory unit in a computing system as a memory heap, the heap including a metadata section and a plurality of segments, each segment having a segment size; create a free list array and class-size array in the metadata section, the class-size array being created such that each element of the size-class array is related a particular one of the plurality of segments and the free list array being created such that each element of the free list array is related to a particular size class; receive a first memory allocation request for a first object; determine that the first object is a small object; assign a class to the first object; identify a first segment to place the first object in by examining the size-class array; subdivide the first segment into multiple portions; determine a first head portion of the first segment, the first head portion representing the first open portion of the segment and being determined by examining the free list array; allocate the first head portion for the first object; receive a command indicating that a transaction is complete; and clear the free list array and the size-class array upon receipt of the command.

Another embodiment of the present invention is directed to a method of memory management that includes allocating a portion of a memory as a memory heap; performing one or more memory allocations for objects in the memory heap; and initializing the heap when it is determined that the heap may be destroyed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Embodiments of the present invention eliminate or reduce the overhead of the costly bookkeeping activities in malloc and free by introducing a freeAll function for initializing the heap. The freeAll function according to the present invention is called from an application when all of the objects in the heap can be destroyed, such as at the end of a Web transaction for the PHP runtime. In some embodiments, the present invention may still retain per-object malloc and per-object free functions. Although applications can continue running without calling a freeAll, such applications may suffer from performance degradation due to the lack of bookkeeping activities.

In contrast to a freeAll function in the region based approach which allows the memory allocator to reuse all of the allocated memory, embodiments of the present invention replace the bookkeeping activities in malloc and free by a freeAll function that cleans up the entire heap, including metadata, such as free lists of unallocated objects. Therefore, in embodiments of the present invention, routines may call the freeAll for bookkeeping even if all of the objects in the heap have already been freed by a per-object free. This approach may reduce the overhead of memory management because the cost to initialize the entire heap is much smaller than the cost of de-fragmenting the heap with many live objects for every invocation of malloc and free.

Embodiments of the present invention may be implemented in a server-side memory manager. In some embodiments, a memory manager utilizing the present invention may receive malloc and free commands from a program in the normal course. Rather than operating on these requests in the conventional manner as described above, the present invention may operate as describe below.

Figure 1:
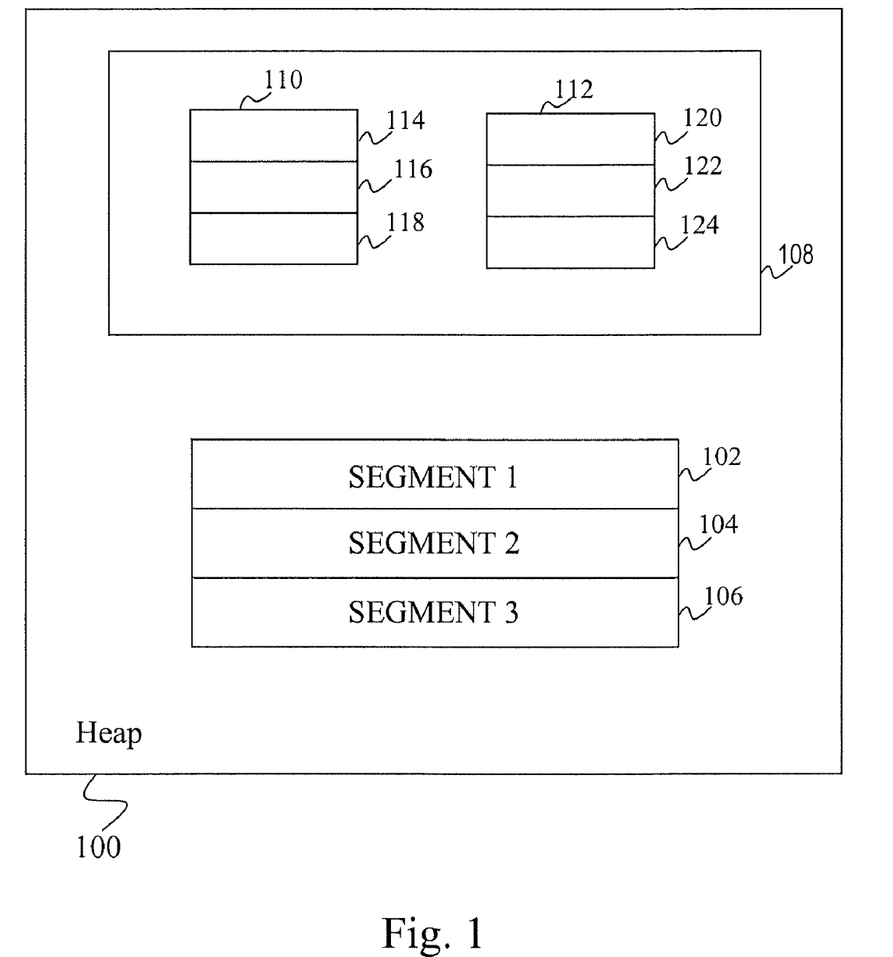
FIG. 1 shows an example of the heap structure in accordance with a memory allocation and maintenance scheme according to an embodiment of the present invention.

FIG. 1 shows an example of the heap structure 100 in accordance with a memory allocation and maintenance scheme according to an embodiment of the present invention. The configuration of the heap structure 100 may be established by a command referred to herein as "FeatherWeight memory allocation" (FWmalloc). This FWmalloc command may be utilized in the present invention each time a malloc command is received by the memory manager.

The heap 100 may include one or more fixed-size memory chunks called segments. For instance, the heap 100 as shown includes segment 1 102, segment 2 104 and segment 3 106. The heap 100 also includes a metadata section 108. The metadata 108 includes a free list array 110 and a size-class array 112.

The size-class array 112 contains an entry for each segment in the heap 100. In particular, the size-class array 112 includes a category description (called a size-class herein) of objects stored in particular segment. In one embodiment, the size-class array 112 is implemented as an array of 1-byte integers that record the size-class of objects stored in each segment. As shown, the size-class array 112 includes a first segment identifier 120, a second segment identifier 122 and a third segment identifier 124. The first segment identifier 120 may include the size-class of objects stored in the first segment 102, the second segment identifier 122 may include the size-class of objects stored in the second segment 104, and the third segment identifier 124 may include the size-class of objects stored in the second segment 106. Of course, the number of segments is not limited to three and the segment identifiers could store the size-class of objects stored in the segments in a manner other than as described above.

The free list array 110 includes pointers to the first available location of each segment. For example, the free list array 110 may include a first pointer 114 pointing to the head of a segment containing a first size-class of objects, a second pointer 116 pointing to the head of a segment containing a second size-class of objects, and a third pointer 118 to the head of a segment containing a third size-class of objects.

In one embodiment, each segment starts at an address that is a multiple of the size of the segment. Such alignment restrictions may allow FWmalloc to efficiently determine to which segment an object belongs from the address of the object. In particular, FWmalloc divides each segment into multiple objects of the same size and uses the segment as an array of those objects. In one embodiment, there may be no per-object metadata between objects. This results in both high space efficiency and better cache utilization.

Like many other high-performance memory allocators, FWmalloc maintains a free-list array 110 for each size-class. The free list array 110 maps allocation requests into the corresponding size-class and allocates memory in the segments from the free list 110 for the particular size-class for the segment stored in the size class array 112.

FIG. 1 shows the heap as initialized before any memory allocations have been performed. As such, all of the segments (102, 104, and 106) are empty, all of the array elements of the size class array 112 indicate that the segments are unused, and all of the array elements of the free list array 110 point to a null location.

In one embodiment, FWmalloc classifies objects into two categories, large objects (larger than half the size of a segment) and small objects. Within each of these categories, objects may be categorized into specific size-classes. A size-class, as described above, may be an integer that describes particular size-class. Actual objects may be sorted into particular size-classes based on their sizes and according to predetermined rules. An example of such rules is now described.

A size-class may be established for objects of various sizes according rules based on the actual size of the object. For example, objects that are larger than 512 bytes may be considered large objects. For large objects, the actual size of the object is rounded up to the nearest power of two. In such an embodiment, for example, a 600 byte object may be rounded up to 1024 byte object and particular size class of 1024 bytes may be established. In one embodiment, a large object has a size that is greater than one-half the size of a segment.

In the case of small objects, additional rules may be implemented. For example, for an object having an actual size of less than 128 bytes, the size of the object is rounded up to the nearest multiple of eight (8) bytes. This may allow, for example, objects that are 56 and 63 bytes both to be categorized into a 64 byte size-class. For objects greater than 128 bytes and less than 512 bytes, the size may be rounded up to a multiple of 32 bytes.

The size of a segment is another important parameter, which affects both the amount of memory consumed and the allocation speed. In one embodiment, each segment may be 32 KB. Of course, any definitions of size-classes and segment sizes may be utilized without departing from the spirit or scope of the present invention.

Figure 2A:
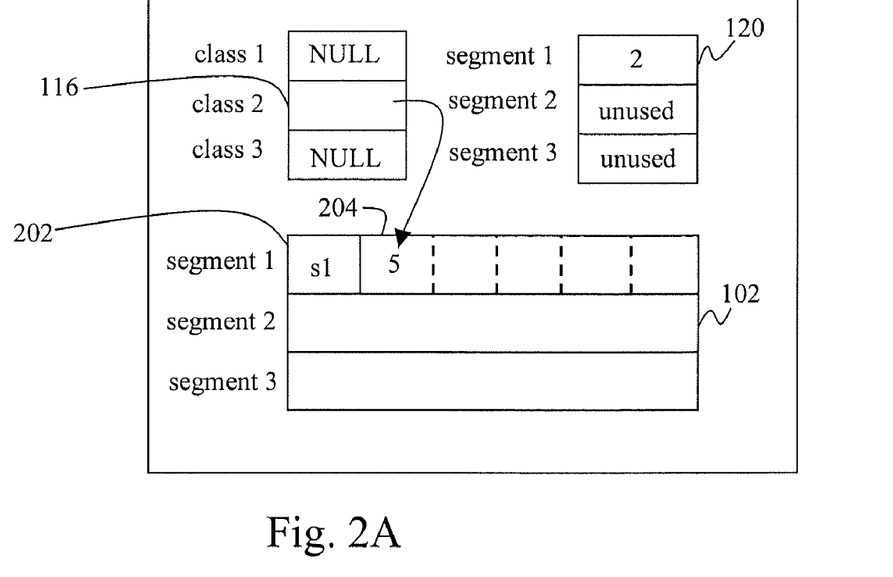
FIGS. 2a-2c depict the state of the heap 100 for various malloc and free calls for a small object corresponding to a size-class represented by the integer 2.
Figure 2B:
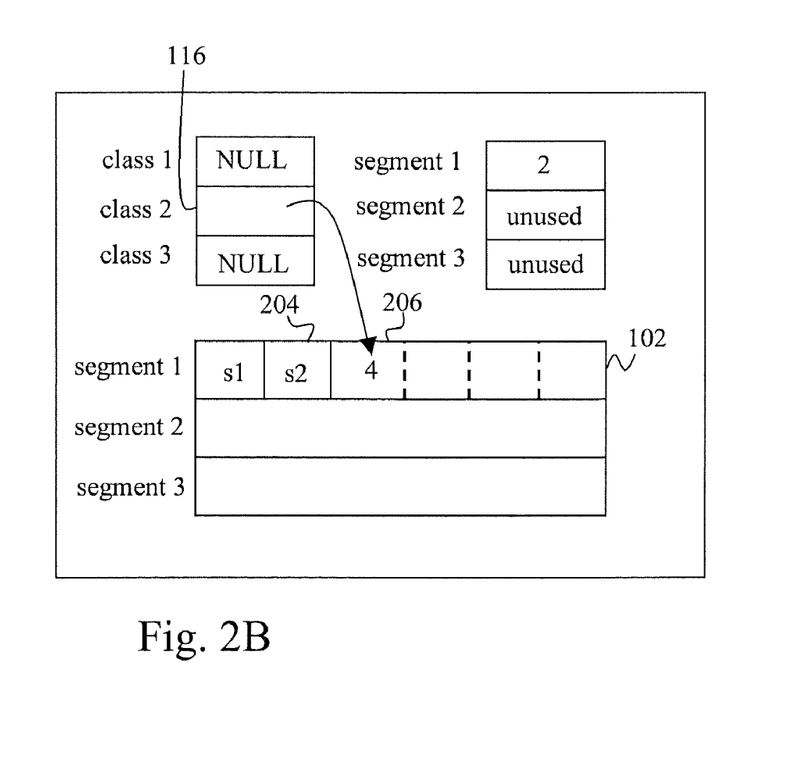
Figure 2C:
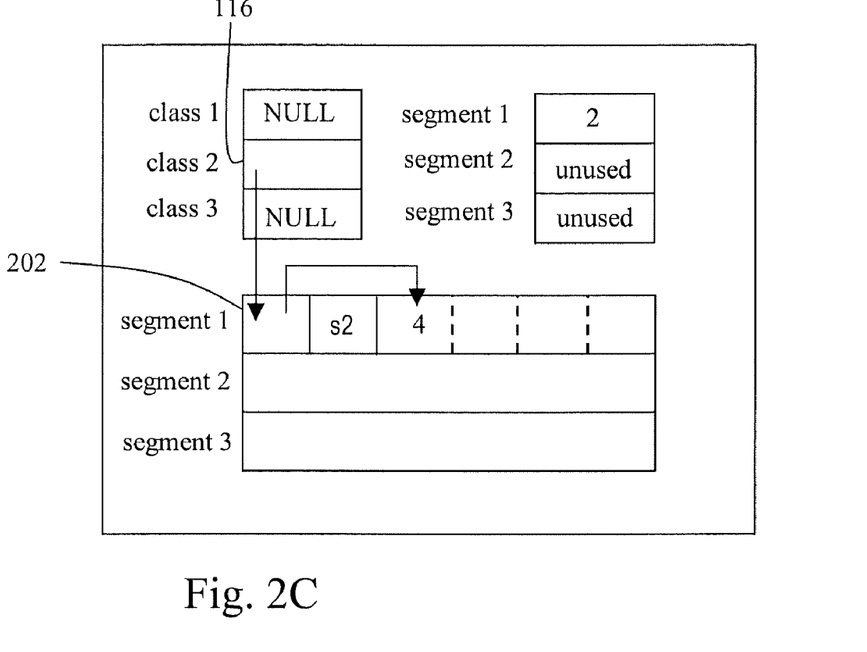

FIGS. 2*a*-2*c* depict the state of the heap 100 for various malloc and free calls for a small object corresponding to a size-class represented by the integer 2. The example shown in FIGS. 2*a*-2*c* assumes that objects of eight or less bytes are in a size-class represented by the integer 1 and objects between nine and 16 bytes are 16 byte objects in a size class represented by the integer 2. For ease of description, the size-class of a particular object will be referred to by the integer that represents it.

To handle the malloc request, FWmalloc first determines the size-class for the requested amount of memory. In this example, the size-class is size-class 2 (between 9 and 16 bytes). FWmalloc may then consult the free-list 110 for the particular size-class. For example, second pointer 116 may be consulted because it contains the head of the segment for storing size-class 2 objects. In this example, the free list is empty because it is the first invocation of malloc.

FWmalloc then generates new free objects for this size class by obtaining an unused segment and dividing the segments into fixed-sized objects corresponding to the size-class. It returns the top of the heap of newly generated objects to the caller and uses a pointer to the second object as the head of the free list. The size-class is recorded in the metadata. In order to track the number of unallocated objects within the segments, FWmalloc stores the number of unallocated objects (5 in this example) at the top of the unallocated objects. That is, the number of unallocated objects may, in some embodiments, be stored in the portion of the segment adjacent to the portion just allocated.

FIG. 2*a* shows a snapshot of the heap after the first call for malloc. In particular, the size-class (2) for the first segment 102 is stored in the first segment location 120. The object that was the subject of the malloc call is allocated in a first portion 202 of the first segment 102. The number of unallocated objects (5 in this example) is stored in the second portion 204 of the first segment 102. The free-list location for size-class 2 (pointer 116) points to the second portion 204 of the first segment 102. The second portion 204 is the first "free" location in the first segment 102 because the first portion 202 has already been allocated. In this example, the second portion is adjacent to the first segment.

FIG. 2*b* shows an example of a next call to malloc with the same size request. Because the size is size-class 2, it will be stored in the first segment 102 (the first segment 102 having previously been assigned to store of objects of size-class 2). At this time, the free list for the size-class 2 (pointer 116) is not empty and, thus, FWmalloc immediately places the object at the top of the free list (the second portion 204), adjusts the pointer 116 to point to the third portion 206, and writes the number of unallocated objects (4 in this example) into the third portion 206.

FIG. 2*c* illustrates an example of a call to free the object allocated by the first malloc. For example a per-object free (s1) may have been called. In this example, freeing the object allows the pointer 116 to be adjusted to the first portion 204. In this manner, the freed object is placed at the top of the corresponding free list. Thus, the freed objects are reused in last-in first-out (LIFO) order. The key feature of FWmalloc is that malloc and free do not execute any other bookkeeping activities, such as sorting objects in the free lists or coalescing or splitting unallocated objects.

Figure 3A:
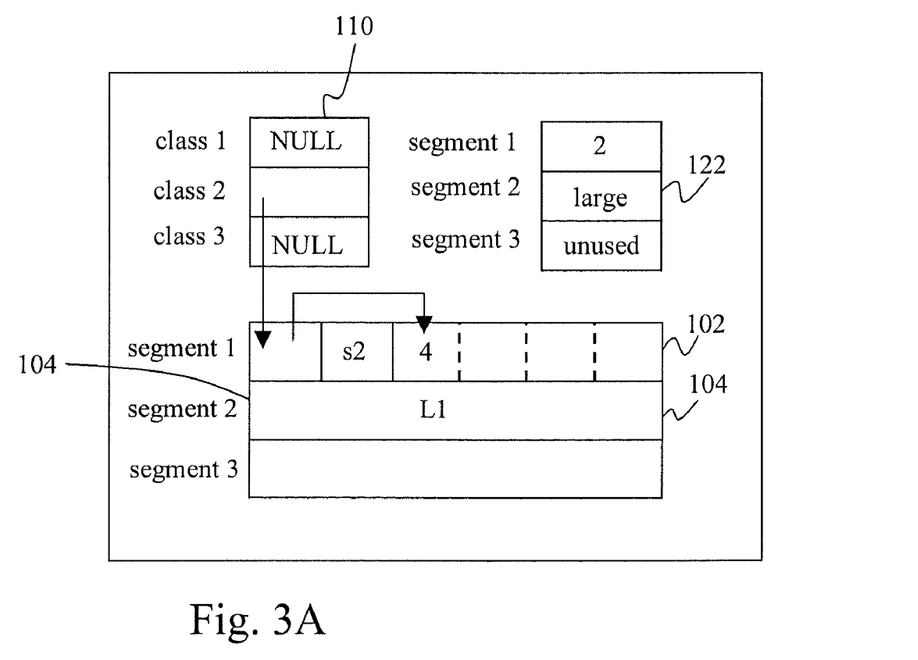
FIGS. 3a-3c depict malloc and free operations for objects that are larger than half of the segment size (i.e., for large objects)
Figure 3B:
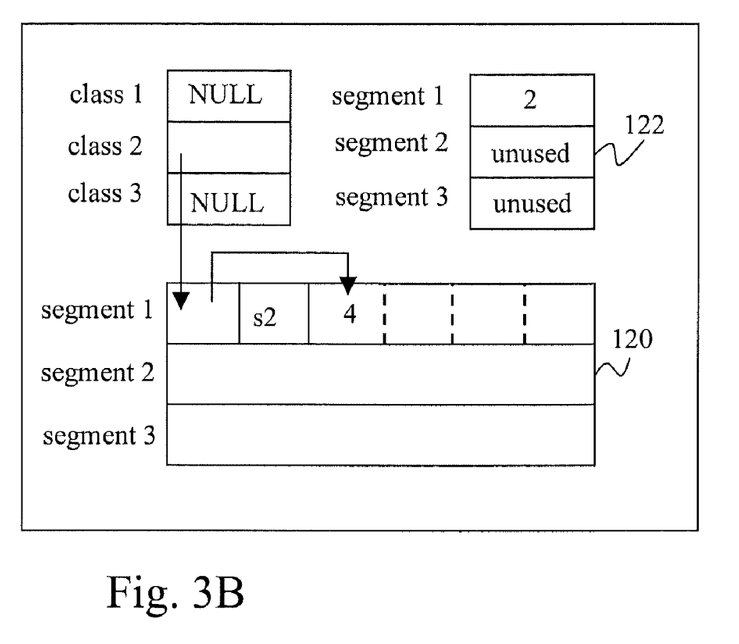

FIGS. 3*a*-3*b* depict malloc and free operations for objects that are larger than half of the segment size (i.e., for large objects). For large objects requests, FWmalloc directly allocates and reclaims the segments without using the free list 110.

FIG. 3*a* shows an example of the handling of a malloc request for a large object according to the present invention. FWmalloc fetches a free segment and returns it to the caller. In this example, the second segment 104 is allocated for the large object L1. According to embodiments of the present invention, the size-class for the second segment 104 is set to large as indicated at block 122.

FIG. 3*b* shows an example of per-object free for the allocated large object L1. According to the present invention, all that needs to be done to accomplish this is to change the description in block 122 to unused. While the information stored in the second segment 120 may still be stored there, indicating in block 122 that the second segment 122 is unused will allow for the second segment 122 to be utilized for the next malloc request of any size object.

Figure 3C:
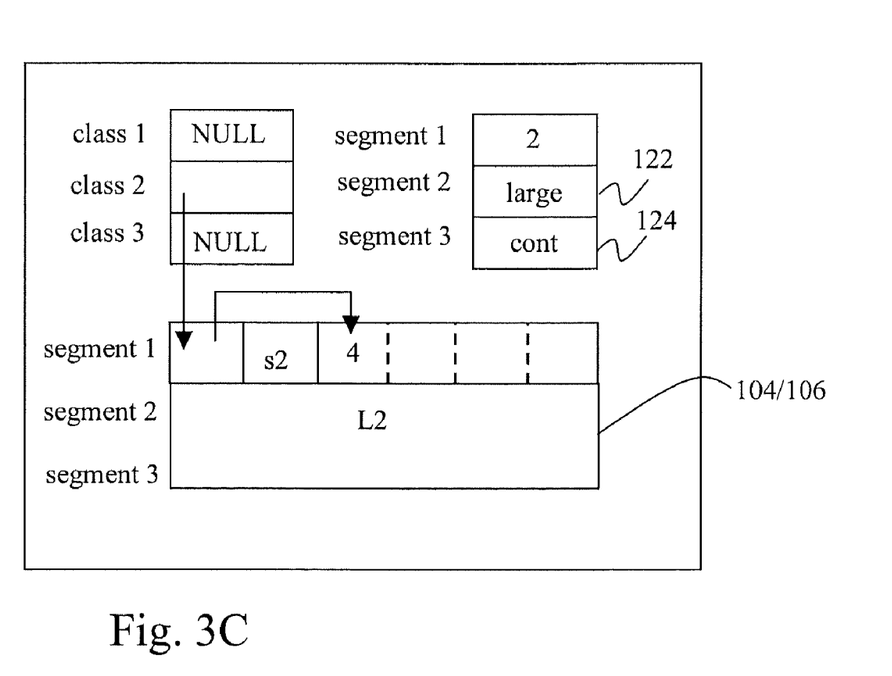

FIG. 3c presents an example of malloc for a size larger than the size of a segment. In this case, FWmalloc allocates a sufficient number of contiguous segments. It marks the size-class 122 as large the first allocated segment (segment 2 104) and marks the other segment (in size class 124) as a continuation (cont.) from the previous segment.

When freeAll is called, FWmalloc according to the present invention clears only the metadata in the heap. The metadata is much smaller than the entire heap. Hence the overhead of freeAll is almost negligible. Thus, embodiments of the present invention, as described above, may omit costly bookkeeping activities from malloc and free by initializing a heap at regular intervals (for example, at the end of each request in the Web application servers). In one embodiment, as described above, the number of unallocated objects subsequent to the top object in an unallocated area is recorded to the top object without using special meta data for managing the unallocated objects in a segment. In some embodiments, cache errors may be reduced according to present invention by setting the top address of a heap not to straddle a page boundary, the heap being used in each of a plurality of processes or threads upon executing the method Embodiments of the present invention may include several optional enhancements based on traits that have been discovered during operation of the present invention. For example, it has been discovered that FWmalloc frequently accesses the metadata in the heap. Thus, accesses to the metadata may often incur cache misses due to associativity overflows if they are located at the same location in the heap. In one embodiment, this may be overcome by changing the position of the metadata in the heaps using the process identifications and the thread identifications to reduce the cache misses due to the associativity overflows. As another example, because FWmalloc obtains a chunk of memory at startup time and uses the chunk as a heap, embodiments of the present invention may use the known "mmap" system call to obtain this block of memory to use large page memory. Most modern processors and operating systems support page sizes of a few MBs to hundreds of MBs to reduce the overhead of translation lookaside buffer (TLB) handling. Using larger size pages for the heap results in notable performance improvements on some processors because of the high overhead of TLB handling. Another example involves the default configuration of the PHP runtime. In particular, the default configuration of the PHP run time is a single-threaded application. However, it can be configured as a multi-threaded application to run as plug-ins for multi-threaded HTTP servers. In this configuration, FWmalloc provides a separate heap for each thread to avoid using a lock for a shared heap. Because those threads are independent instances without communication among them, no object will be freed by a thread that is not the owner of the heap. FWmalloc does not chain the freed objects to the free lists if it is freed by a non-owner thread.

Figure 4:
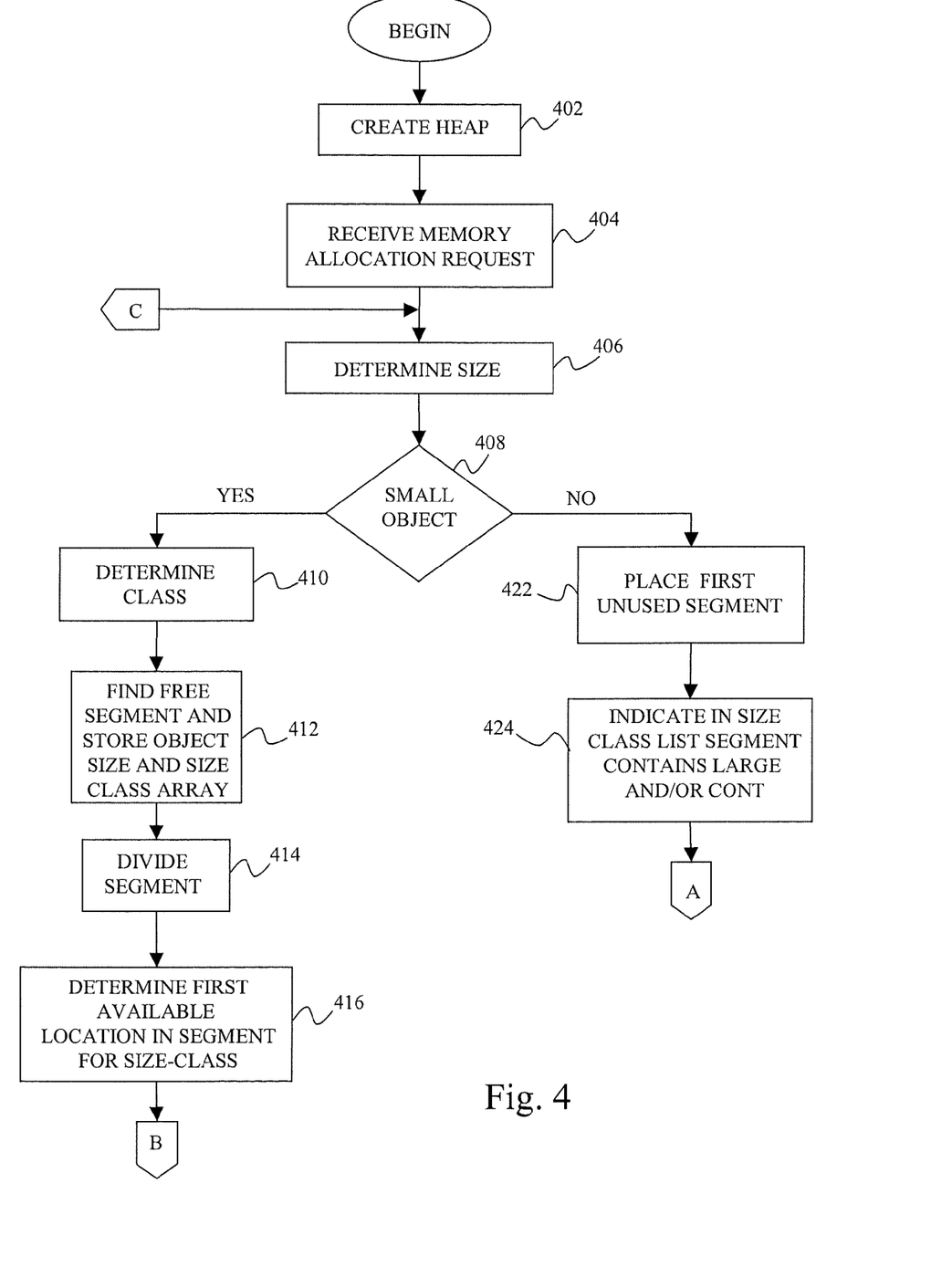
FIG. 4 shows a flowchart of a method according to one embodiment of the present invention.

FIG. 4 shows a method of operating a memory according one embodiment of the present invention. At a block 402 a heap is created. In particular, the memory manager of a computing system may create the heap. In one embodiment, the memory manager causes the heap to be created upon startup of the computing system. In a preferred embodiment, the heap is structured in the manner as shown in FIG. 1. Throughout this description of FIG. 4, reference to elements identified in FIGS. 1-3 may be made from time to time.

In particular, the heap 100 may be created such that includes a storage portion (implemented as, for example, segments 102, 104 and 106) and a metadata portion 108. The metadata data portion 108 may include a size-class array 112 and a free-list 110 as described above. In one embodiment, the size of the storage portion is larger than the metadata portion 108.

At a block 404 a memory allocation request is received. For example, an algorithm operating in a scripting language may call the "malloc" function for a particular object. According embodiments of the present invention, the memory manager receives such a request and may operate generally as described above. The following description provides a more detailed explanation of portions of that operation.

At a block 406 the size of the object is determined. This determination may include determining if the object is small or large object. In one embodiment, large objects may be all objects whose size is greater than one half the size of a segment. All other objects may be classified as small objects. Of course, the size of a segment may vary between applications. In one embodiment, each segment may be capable of storing 32 KB of data. In such an embodiment, a large object would be any object that is greater than 16 KB long.

At a decision block 408 the size of the object determines whether processing proceeds to block 410 or to block 422. If the object is a small object, processing proceeds to block 410. At block 410 the class of the small object is determined. As discussed above, the classes may be user defined and various rounding up or object length may occur.

At a block 412 a free segment to store the small object is found. In one embodiment, this may be accomplished by scanning the size-class list for an open entry therein. For instance, if the first segment identifier 120 is contains a null value or otherwise indicates that the first segment 412 is empty, the first segment 102 may be selected.

At a block 413 the size-class of the object is stored in the size-class array 112 at a location that relates to the selected segment. At a block 414 the selected segment is divided into portions that are equal to the size-class that is to be stored in the selected segment.

At a block 416, the first available portion (head portion) for the particular size-class in the selected segment is determined. This may be accomplished, for example, by consulting the free list array 110 at the location related to a particular size class. At a block 418 the selected segment is allocated for the object at the location indicated in the free list 112. The location in the free-list is then changed to indicate the next available portion of the selected segment.

If object forming the memory allocation request received at block 404 is not a small object (i.e., is a large object), at a block 422, the first unused segment indicated in the size class list 11 is allocated to the large object. The size-class identifier in the size-class array for the first empty segment has an indication that the segment includes a large object. Of course, if the object is larger than the size of a segment, multiple segments may be used and each successive segment marked as a continuation segment.

Regardless of whether the object was large or small, a next request is received at a block 426. If, as determined at a block 428, the request is a per-object free request, the process proceeds to a block 434. As discussed above, a per-object free only releases the memory allocated for a particular object, not the entire heap. At block 434 it is determined if the per-object free was for a small object. If so, the class pointer in the free list pointing to the segment allocated for the object is changed so that it points to the location of the freed object. In addition, the location the free list previously pointed (the prior next available portion of the segment) may be stored in the location of the free object as indicated in FIG. 2c to ensure that after the freed object is reallocated, the end of the list may be recovered. Processing then returns to block 426.

If, on the other hand the per-object free was for a large object, the size-class array is updated to indicate that the segment that contained the freed object is now unused at a block 438. Processing then returns to block 426.

If it is determined at block 428 that the request is not a per-object free, processing proceeds to a block 430. If the request is not a freeAll request, it is assumed the request was a memory allocation request and processing returns to block 406. If it is determined that the request was a freeAll request, the metadata in the free-list 110 is set to null and the metadata in the size-class list is set to unused. In effect, setting the metadata in such a manner effectively frees the entire heap. In some embodiments, a freeAll request may be received each time a particular process completes. An example of such a completion may occur when a at the end of transaction for a PHP runtime.

Figure 5:
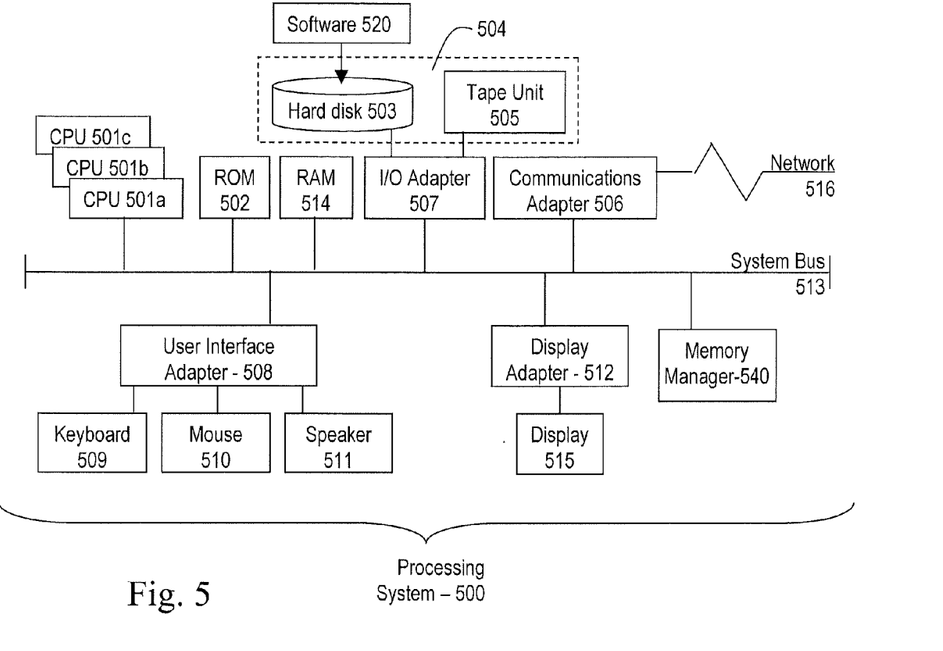
FIG. 5 shows a processing system according to one embodiment of the present invention.

FIG. 5 shows a processing system 500 for implementing the teachings herein. In this embodiment, the system 500 has one or more central processing units (processors) 501*a*, 501*b*, 501*c*, etc. (collectively or generically referred to as processor(s) 501). In one embodiment, each processor 501 may include a reduced instruction set computer (RISC) microprocessor. Processors 501 are coupled to system memory 514 and various other components via a system bus 513. Read only memory (ROM) 102 is coupled to the system bus 113 and may include a basic input/output system (BIOS), which controls certain basic functions of system 500. According to the present invention, the memory manager 540 controls allocation of memory in one or both the ROM 102 and the RAM 114.

FIG. 5 further depicts an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage device 505 are collectively referred to herein as mass storage 504. A network adapter 506 interconnects bus 513 with an outside network 516 enabling data processing system 100 to communicate with outside systems. The outside network 516 may be, for example, the Internet, a wide-area network, a local area network or the like.

A screen (e.g., a display monitor) 515 may be connected to system bus 513 by display adaptor 512, which may include a graphics adapter to improve the performance of graphics intensive applications and a video controller. In one embodiment, adapters 507, 506, and 512 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 513 via user interface adapter 508 and display adapter 512. A keyboard 509, mouse 510, and speaker 511 all interconnected to bus 513 via user interface adapter 508, which may include, for example, a Super I/O chip integrating multiple device adapters into a single integrated circuit.

Thus, as configured in FIG. 1, the system 500 includes processing means in the form of processors 501, storage means including system memory 514 and mass storage 504, input means such as keyboard 509 and mouse 510, and output means including speaker 511 and display 515. In one embodiment, a portion of system memory 514 and mass storage 504 collectively store an operating system such as the AIX® operating system from IBM Corporation to coordinate the functions of the various components shown in FIG. 1.

It will be appreciated that the system 500 can be any suitable computer or computing platform, and may include a terminal, wireless device, information appliance, device, workstation, mini-computer, mainframe computer, personal digital assistant (PDA) or other computing device.

Examples of operating systems that may be supported by the system 500 include Windows 95, Windows 98, Windows NT 4.0, Windows XP, Windows 2000, Windows CE, Windows Vista, Macintosh, Java, LINUX, and UNIX, or any other suitable operating system.

As disclosed herein, the system 500 includes machine readable instructions stored on machine readable media (for example, the hard disk 504) for capture and interactive display of information shown on the screen 515 of a user. As discussed herein, the instructions are referred to as "software" 520. The software 520 may be produced using software development tools as are known in the art.

In some embodiments, the software 520 is provided as an overlay to another program. For example, the software 520 may be provided as an "add-in" to an application (or operating system). Note that the term "add-in" generally refers to supplemental program code as is known in the art. In such embodiments, the software 520 may replace structures or objects of the application or operating system with which it cooperates.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of operating a memory system, the method comprising:
    allocating a portion of a memory unit in a computing system as a memory heap, the heap including a metadata section and a plurality of segments, each segment having a segment size;
    creating a free list array and class-size array in the metadata section, the class-size array being created such that each element of the size-class array is related a particular one of the plurality of segments and the free list array being created such that each element of the free list array is related to a different size class;
    receiving a first memory allocation request for a first object;
    determining that the first object is a small object;
    assigning a class to the first object;
    identifying a first segment to place the first object in by examining the size-class array;
    subdividing the first segment into multiple portions;
    determining a first head portion of the first segment, the first head portion representing the first open portion of the segment and being determined by examining the free list array;
    allocating the first head portion for the first object;
    receiving a command indicating that a transaction is complete; and
    clearing the free list array and the size-class array upon receipt of the command.

2. The method of claim 1, further comprising:
    receiving a second memory allocation request for a second object;
    determining that the second object is a large object;
    identifying a second segment, the second segment being indicated as unused in the size-class array; and
    allocating the second segment for the second object.

3. The method of claim 2, wherein determining the second object is a large object includes determining that the second object is larger than one-half the size of second segment.

4. The method of claim 3, further comprising:
    indicating in the element related to the second segment that the second segment is assigned to a large object.

5. The method of claim 4, wherein the determining that the second object is a large object further includes determining that the second object is larger than the size of the second segment, the method further including:
    allocating a third segment for a portion of the second object; and
    indicating in the element related to the third segment that the third segment is allocated to a continuation of the second object.

6. The method of claim 4, further including:
    receiving a per-object free request for the second object; and
    indicating in the element related to the second segment that the second segment is unused.

7. The method of claim 1, wherein determining that the first object is a small object includes determining that the first object is smaller than one half the size of the first segment.

8. The method of claim 7, wherein assigning the first object a class includes:
    determining a size of the object; and
    rounding the size of the object up to predetermined value.

9. The method of claim 8, wherein subdividing the first segment includes dividing the first segment into two or more portions, each portion having a size equal to the predetermined value.

10. The method of claim 1, wherein a location of the first head portion is stored in the element in the free list related to the size class of the first object.

11. The method of claim 1, wherein clearing the free list array includes writing a null value to each element of the free list and wherein clearing the size-class array includes writing an indication in each element of the size-class array that the segment each element is related to is unused.

12. The method of claim 1, further comprising:
    writing the address of the portion adjacent to the head portion in the location in the free-list array that contained the address of the head portion;
    receiving a memory allocation request for a second object, the second object being a small object of the same class as the first object; and
    allocating the adjacent portion for the second object.

13. The method of claim 12, wherein clearing the free list array includes writing a null value to each element of the free list and wherein clearing the size-class array includes writing an indication in each element of the size-class array that the segment each element is related to is unused.

14. The method of claim 12, further comprising:
    receiving a per-object free request for the first object; and
    writing the address of the first portion into the element related to the first segment.

15. A system comprising:
    a central processing unit (CPU);
    a memory coupled to the CPU; and
    a memory manager coupled the CPU and the memory and configured to allocate portions of the memory for objects based on commands received from a scripting program, wherein the memory manager is further configured to:
        allocate a portion of the memory unit in a computing system as a memory heap, the heap including a metadata section and a plurality of segments, each segment having a segment size;
        create a free list array and class-size array in the metadata section, the class-size array being created such that each element of the size-class array is related a particular one of the plurality of segments and the free list array being created such that each element of the free list array is related to a different size class;
        receive a first memory allocation request for a first object;
        determine that the first object is a small object;
        assign a class to the first object;
        identify a first segment to place the first object in by examining the size-class array;
        subdivide the first segment into multiple portions;
        determine a first head portion of the first segment, the first head portion representing the first open portion of the segment and being determined by examining the free list array;
        allocate the first head portion for the first object;
        receive a command indicating that a transaction is complete; and
        clear the free list array and the size-class array upon receipt of the command.

16. The system of claim 15, wherein the memory manager is further configured to:

write the address of the portion adjacent to the head portion in the location in the free-list array that contained the address of the head portion;

receive a memory allocation request for a second object, the second object being a small object of the same class as the first object; and allocate the adjacent portion for the second object.

17. The system of claim 16, wherein the memory manager is configured to clear the free list array by writing a null value to each element of the free list and clear the size-class array by writing an indication in each element of the size-class array that the segment each element is related to is unused.

18. The system of claim 16, further wherein the memory manager is further configured to:

receive a per-object free request for the first object; and write the address of the first portion into the element related to the first segment.

* * * * *